US008444084B2

(12) United States Patent
Udall et al.

(10) Patent No.: US 8,444,084 B2
(45) Date of Patent: May 21, 2013

(54) AEROENGINE MOUNTING

(75) Inventors: Kenneth F Udall, Derby (GB); Peter K Beardsley, Derby (GB)

(73) Assignee: Rolls-Royce PLC, London (GB)

(*) Notice: Subject to any disclaimer, the term of this patent is extended or adjusted under 35 U.S.C. 154(b) by 1138 days.

(21) Appl. No.: 11/785,826

(22) Filed: Apr. 20, 2007

(65) Prior Publication Data

US 2007/0246603 A1    Oct. 25, 2007

(30) Foreign Application Priority Data

Apr. 22, 2006   (GB) .................................. 0607991.7

(51) Int. Cl.
    B64D 27/26    (2006.01)
(52) U.S. Cl.
    USPC ........................................................ 244/54
(58) Field of Classification Search
    USPC .................... 244/54; 248/554; 60/796, 797
    See application file for complete search history.

(56) References Cited

U.S. PATENT DOCUMENTS

| 2,978,209 | A | | 4/1961 | Kerry | |
|---|---|---|---|---|---|
| 3,844,115 | A | * | 10/1974 | Freid | ............................... 244/54 |
| 4,147,029 | A | | 4/1979 | Sargisson | |
| 4,150,802 | A | * | 4/1979 | Evelyn et al. | ................... 244/54 |
| 4,458,863 | A | | 7/1984 | Smith | |
| 4,854,525 | A | | 8/1989 | Chee | |
| 5,443,229 | A | | 8/1995 | O'Brien | |
| 5,474,258 | A | * | 12/1995 | Taylor et al. | .................... 244/54 |
| 5,927,644 | A | * | 7/1999 | Ellis et al. | ........................ 244/54 |
| 6,059,227 | A | | 5/2000 | Le Blaye | |
| 2005/0230532 | A1 | * | 10/2005 | Stretton et al. | .................. 244/54 |
| 2005/0271503 | A1 | * | 12/2005 | Harper et al. | .............. 415/170.1 |

FOREIGN PATENT DOCUMENTS

| EP | 0 311 155 A | 4/1989 |
|---|---|---|
| EP | 1103463 A1 | 5/2001 |
| GB | 1236917 | 6/1971 |
| GB | 1 504 290 | 3/1978 |
| GB | 2 151 995 A | 7/1985 |
| GB | 2 266 080 A | 10/1993 |
| WO | 9311041 A1 | 6/1993 |
| WO | WO 96/11843 A | 4/1996 |

OTHER PUBLICATIONS

European Search Report.
Extended European Search Report.

* cited by examiner

*Primary Examiner* — Tien Dinh
*Assistant Examiner* — Richard R Green
(74) *Attorney, Agent, or Firm* — Jeffrey S. Melcher; Manelli Selter PLLC

(57) ABSTRACT

A mounting arrangement of a gas turbine engine comprising a core engine, surrounded by a nacelle having a bypass duct, the mounting arrangement comprising a front mount, a rear mount and characterized by the mounting arrangement further comprising a fail-safe mount axially spaced from the front and rear mounts. The fail-safe mount comprises a number of A-frames connecting the core engine and the bypass duct. In normal operation the fail-safe mount does not transmit loads between the engine and a pylon, except in the event of damage to either the front or rear mounts.

18 Claims, 6 Drawing Sheets

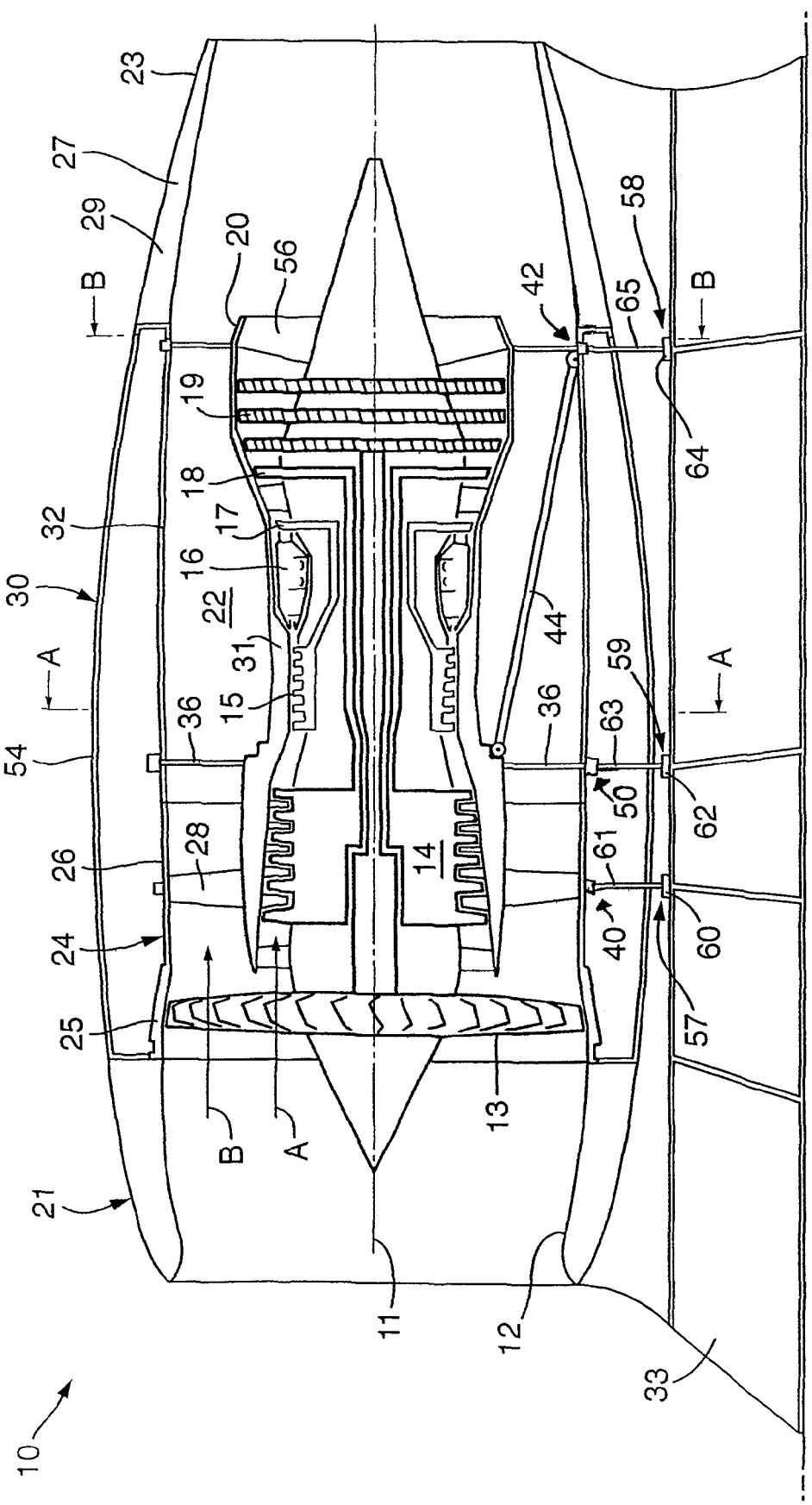

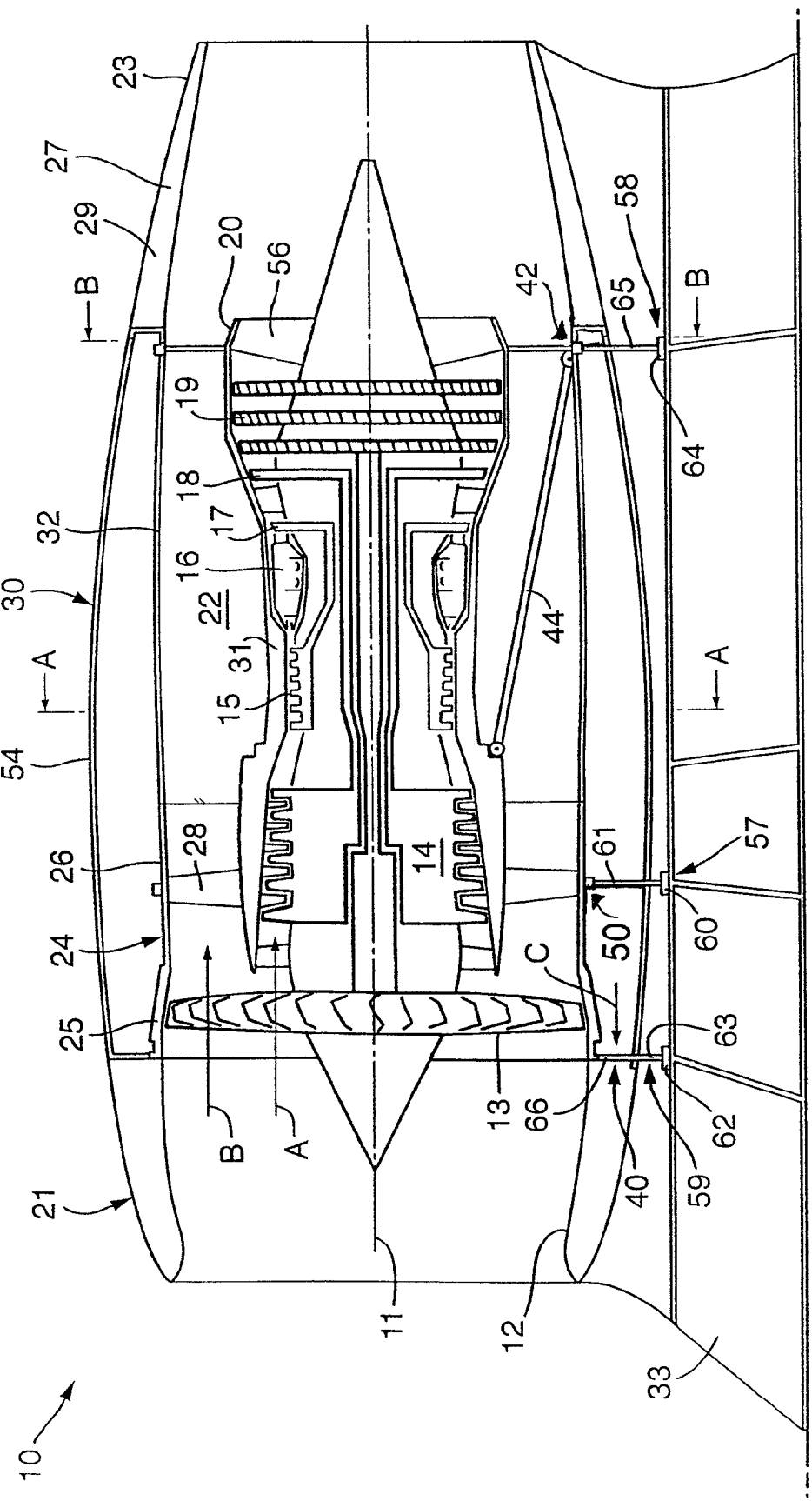

AEROENGINE MOUNTING

FIELD OF THE INVENTION

The present invention relates to a mounting arrangement for an aeroengine and in particular, but not exclusively, a mounting arrangement for fuselage mounted engines.

BACKGROUND OF THE INVENTION

There is a requirement for aircraft certification to minimize hazards in the very unlikely event of uncontained engine rotor failures. Some current aircraft have their engines mounted either side of the rear end of their fuselage. This means that these engines have significant fuselage structure between them to deflect rotor failure debris and as the engines are spaced by the fuselage diameter, the angle range for impact is reduced and hence the probability of failure of one engine causing the failure of the other is very small.

It is desirable to mount a pair of engines higher on the fuselage to reduce engine related noise amongst other requirements. This is shown in FIG. 1 where existing mounting locations are given by engine pair A and new engine positions are given by B. Note that new engine positions B mean that the engines are in a direct 'line-of-sight' of one another. However, with current mounting systems it is possible that cross engine debris could cause failure of a mount leading to a potential loss of the engine. With the engines (B) in a higher position such a loss could also lead to the released engine damaging flight control surfaces such as on a tailplane. Furthermore, the industry trend for larger fan diameter engines for a given thrust results in a larger target for cross-engine debris.

Therefore it is an object of the present invention to provide an alternative mounting arrangement that ensures any engine does not become detached from the fuselage or wing in the event of release of an engine component and in particular a part of a rotor disc.

SUMMARY OF THE INVENTION

In accordance with the present invention a gas turbine engine is mounted on a pylon via a mounting arrangement comprising a front mount, a rear mount and characterised by the mounting arrangement further comprising a fail-safe mount axially spaced from the front and rear mounts, wherein the fail-safe mount does not transmit loads between the engine and the pylon except in the event of damage to either the front or rear mounts.

Preferably, each mount is attached to a discrete pylon connector.

Preferably, each pylon connector comprises a mount pad and a frame.

Preferably, the engine comprises a core engine casing, a fan casing and an annular array of outlet guide vanes connecting the core engine casing and the fan casing, the engine is surrounded by a nacelle.

Preferably, the nacelle comprises a structurally stiff inner wall capable of carrying loads between the fan casing and the rear mount.

Preferably, the front mount is positioned on the fan casing adjacent the annular array of outlet guide vanes.

Alternatively, the front mount is positioned on the core engine casing.

Preferably, the engine comprises a tail bearing housing, the rear mount is connected to the tail bearing housing.

Alternatively, the engine comprises a tail bearing housing, the rear mount connects the tail bearing housing and the structurally stiff inner wall.

Preferably, the rear mount comprises at least one A-frame connecting between the tail bearing housing and the structurally stiff inner wall.

Preferably, the fail-safe mount comprises at least one A-frame, the A-frame connecting between the core engine and the structurally stiff inner wall.

Preferably, the fail-safe mount comprises more than one A-frame, the A-frames are arranged symmetrically to accommodate commonly spaced port and starboard pylon installations.

Preferably, the pylon connects to two circumferentially spaced A-frames.

Preferably, the pylon comprises a mount beam that extends circumferentially about part of the engine and connects to the two circumferentially spaced A-frames.

Preferably, the at least one A-frame is rigidly connected between the core engine casing and the structurally stiff inner wall and provides stiffening to each.

Preferably, the fail-safe mount is position between the front and rear mounts.

Preferably, either the inlet comprises a bulkhead, the fail-safe mount is attached to the bulkhead. Alternatively, or the fan casing comprises a bulkhead and the fan casing comprises a fan containment casing and a rearward casing, the bulkhead is formed on the fan containment casing.

Alternatively, the fail-safe mount is position forward of the front mount.

Preferably, the bulkhead comprises a frame.

BRIEF DESCRIPTION OF THE DRAWINGS

The present invention will be more fully described by way of example with reference to the accompanying drawings in which:

FIG. 2 is a schematic section of part of a ducted fan gas turbine engine incorporating a fail-safe mount 50 in accordance with a first embodiment of the present invention;

FIG. 5 is a schematic section of part of a ducted fan gas turbine engine incorporating a fail-safe mount 50 in accordance with a second embodiment of the present invention;

DETAILED DESCRIPTION OF THE INVENTION

Figure 1:
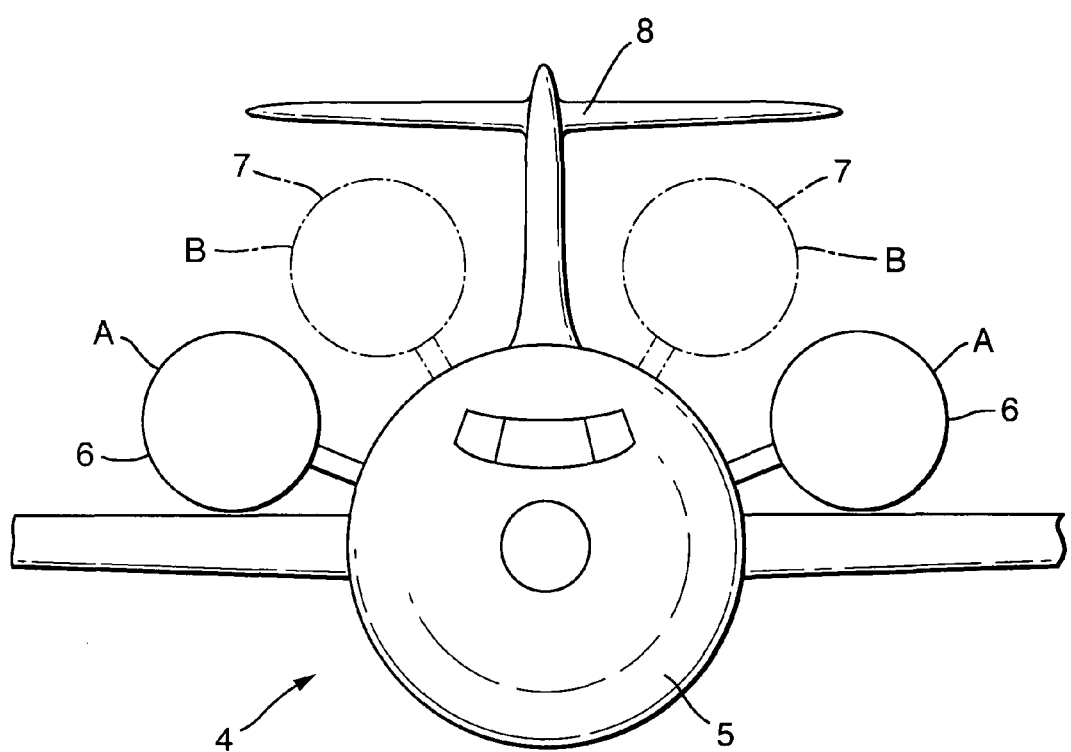
FIG. 1 is a front view of an aircraft comprising a pair of fuselage mounted engines in a first position and in a second position.

Referring to FIG. 1 it is desirable to mount a pair of engines 6 higher on an aircraft's 4 fuselage 5 to reduce engine related noise as perceived on the ground. Existing conventional engine mounting locations are indicated at A and preferred new engine positions are at B. For conventional engine mounting positions A, there is significant fuselage structure between them to deflect rotor failure debris. Furthermore, with the engines being spaced further apart there is less chance of failure of one engine causing the failure of the other or its mountings. Note that new engine positions B mean that the engines are in a direct 'line-of-sight' of one another and it is therefore more possible that cross engine debris could cause failure of a mount leading to a potential loss of the engine 6. With the engines (B) in a higher position such a loss could subsequently lead to the released engine 6 damaging flight control surfaces such as on a tail-plane 8. This is clearly undesirable.

With reference to FIG. 2, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 12 is accelerated by the fan 13 to produce two air flows: a first airflow A into the intermediate pressure compressor 14 and a second airflow B which passes through a bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The fan 13 is circumferentially surrounded by a structural member in the form of a fan casing 24, which is supported by an annular array of outlet guide vanes 28. The fan casing 24 comprises a rigid containment casing 25 and attached rearwardly thereto is a rear fan casing 26.

A thrust reverser unit 29 is disposed within the nacelle 21 at its downstream end 27. This thrust reverser unit 29 may be in the form of bucket doors, an example of which is used in conjunction with the BR715® engine of the present Applicant. The thrust reverser 29 is deployed during the landing phase of the aircraft to help reduce stopping distance. However, the thrust reverser unit 29 may be omitted where substitute aircraft braking means are provided.

Conventionally an engine is mounted via a front mount 40 and a rear mount 42. Typically, the front mount 40 is designed to accommodate vertical and side loads from the engine and the rear mount 42 is designed to support engine thrust, via thrust links 44, vertical and side loads. In combination the front and rear mounts 40, 42 accommodate pitch and yaw bending moments.

A known bracket design of the front mount 40 is disclosed in U.S. Pat. No. 6,059,227, and comprises a main attachment structure and an emergency or standby attachment structure.

The main attachment structure includes a fitting fixed to the strut, as well as at least two swivelled rods connecting the fitting to the engine. The standby attachment structure, through which no force passes when the main attachment structure is operational, connects directly, with a clearance, the strut to the engine. It comprises a yoke integral with the strut and passing through a window formed in the fitting, or a rod articulated to the engine and to the strut. Thus in the event of failure of a loaded part of the mounting the standby attachment would then attach between the engine and the pylon. However, where the whole front mount is disabled due to either debris from its own engine or that of another engine, the engine may detach from the pylon completely. Similarly, the rear mount has redundant features built into it, but again complete failure of the rear mount 42 could lead to engine 10 release.

The present invention is realized by the provision of a third or fail-safe mount arrangement 50 spaced axially apart from both the front and rear mounts 40, 42. Furthermore, the fail-safe mount arrangement 50, the front and rear mounts 40, 42 are connected to independent and discrete mount pads 60, 62, 64 on the pylon 33 and which are spaced axially apart from one another. Alternatively, a single mount pad (60, 62) may be used for connecting the pylon to the front and fail-safe mounts 40, 50. The mounts 40, 42, 50 are connected to the mount pads 60, 62, 64 via rigid strut arrangements 61, 63, 65.

The third or fail-safe mount arrangement 50 comprises an arrangement of struts 63 (further described with reference to FIGS. 3 and 4) rigidly connecting between a radially inner wall 32 of the structural bypass duct (SBPD) 30 and a core engine casing or fairing 31.

An engine incorporating the third or fail-safe mount arrangement 50 may comprise any conventional front and rear mounts 40, 42. The front mount reacts vertical, side, thrust and torque loads, the rear mount reacts side and vertical loads. It should be appreciated that other front and rear mount load paths are possible, but are within the scope of the present invention. In this case the fail-safe mount 50 is capable of reacting vertical, side, thrust and torque loads. Thus in the event of failure of either front or rear mount 40, 42 any load combination may be transferred to the fail-safe mount 50.

In this first embodiment the nacelle 21 comprises a rigid structural bypass duct 30 (SBPD). The SBPD 30 comprises a structurally stiff inner wall 32 and the fan casing 24. The SBPD 30 is characterised by the rear mount 42 rigidly connecting a downstream part of the SPBD 30 to the engine's tail bearing housing 56. The upstream end of the SBPD 30 is connected to the rearward part of the fan casing 26. The SBPD 30 carries aerodynamic loads of the intake 12 to the rear mount 42 and therefore advantageously avoids these loads from bending the core engine and its casing 31.

For access to the engine 10, two C-shaped cowl doors 54 are rotatably mounted to the SBPD 30 or alternatively an engine pylon 33 that connects the engine 10 to a wing or a fuselage of an aircraft. During maintenance of the engine or its accessories, mounted on the fan casing 24 or core engine fairing 31, the C-shaped cowl doors 54 are swung and held open in a conventional manner.

Figure 3A:
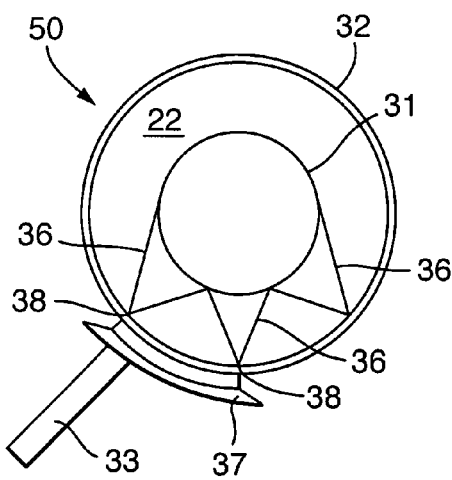
FIG. 3A is a section A-A on FIG. 2 and shows a first embodiment of an A-frame arrangement of the fail-safe mount.
Figure 3B:
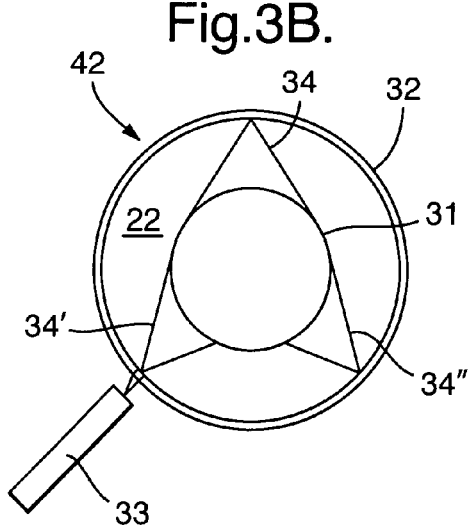
FIG. 3B is a section B-B on FIG. 2 and shows an A-frame arrangement of a rear mount.

FIG. 3A shows a first embodiment of an A-frame arrangement of the fail-safe mount 50. FIG. 3B shows an A-frame arrangement of the rear mount 42. The front mount 40 interfaces onto the rear fan casing 26 adjacent the outlet guide vane array 28, which is a particularly stiff structure. In a preferred embodiment, the rear mount 42 comprises three sets of A-frames 34. Two of the A-frames 34' and 34" are aligned such that their apex 38 coincides with the pylon 33 position, when mounted to either the port or starboard sides of the aircraft, and the third A-frame 34 is equally spaced (at the 12 O'clock position.) Thus due to the spacing of the A-frames, the inner wall 32 of the SBPD 30 remains as circular as possible during engine operation.

In FIG. 3A, the fail-safe mount 50 comprises three sets of A-frames 36. To react the loads a mount beam 37 is used to span between apexes 38 of adjacent A-frames. The A-frames 36 link the inner wall 32 of the SBPD 30 with the core fairing 31 or intercase. This preferred A-frame arrangement is symmetrical such that the same configuration may be used for both port and starboard engine installations. To react thrust loads the mount includes hard stops which react axial loads in the event of loss of the rear mount 42.

Figure 4A:
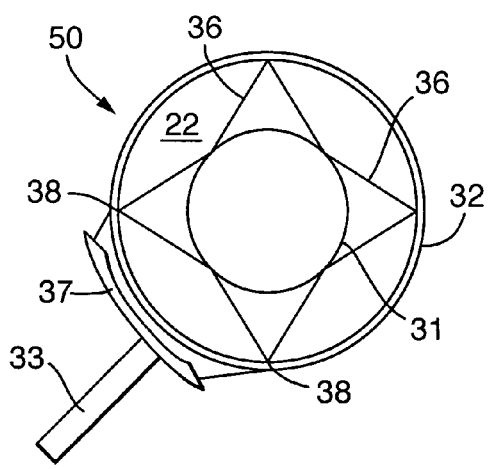
FIG. 4A is a section A-A on FIG. 2 and shows an alternative arrangement of the fail-safe mount 50.
Figure 4B:
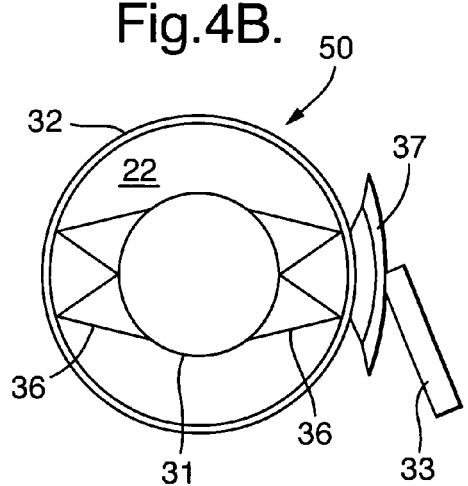
FIG. 4B is a section A-A on FIG. 2 and shows a further alternative arrangement of the fail-safe mount 50.
Figure 4C:
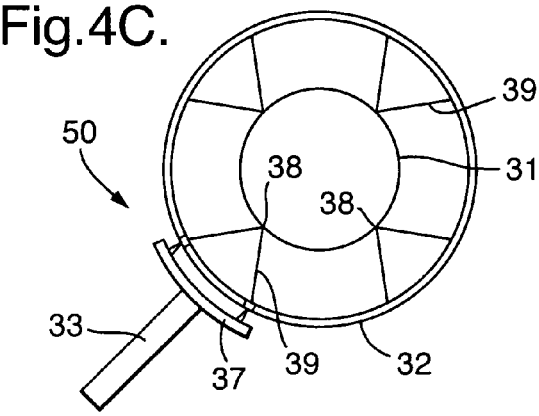
FIG. 4C is a section A-A on FIG. 2 and shows a yet further alternative arrangement of the fail-safe mount 50.

In FIG. 4A, the fail-safe mount 50 comprises four A-frames equally spaced about the circumference of the engine 10. However, the A-frames at 3 and 9 O'clock could also be moved nearer the bottom dead centre A-frame. The pylon 33 carries the beam 37 that spans between adjacent apexes 38. Similarly, in FIG. 4B, there are four A-frames 34, arranged in two closely positioned pairs either side of the engine 10. In FIG. 4C the A-frames 39 are inverted relative to the FIGS. 4A and 4B embodiments. Thus the apexes 38 are radially inwardly attached to the core engine casing 31. An advantage of this design is that the two radially outward leg ends are attached to the beam 37 to give a more closely spaced support to counter moments and torque and therefore a smaller beam 37.

Not only does the provision of the fail-safe mount 50 allow axial separation of the mount systems (front 40, fail-safe 50 and rear 42), but the use of a structurally strong and stiff inner wall 32 allows the pylon engagement points to be remote from the engine core casing 31, thus a lighter pylon may be used. Advantages of the present invention are reduced bypass duct 22 blockage and a greater commonality between port and starboard engines. Although the fail-safe mount is positioned part way along the core fairing 31, because the SBPD 30 is structurally strong, spreading of the engine and aerodynamic loads means that core engine bending will be minimized. Furthermore, although the fail-safe mount 50 does not carry loads to the pylon 33, the A-frame structure does provide additional rigidity for both the bypass duct wall 32 and the core fairing 31. Additional rigidity for the core fairing 31 means that the fairing 31 does not deflect out of its desired circular shape as much allowing significantly small clearances gaps between casing and rotor components, thereby improving engine efficiency.

This first embodiment is particularly suited for use with a three-shaft engine where a rigid bearing assembly is present between the high pressure compressor 15 and intermediate pressure compressor 14. Here the fail-safe mount 50 is positioned generally radially outwardly of the rigid bearing assembly, and thus bending of the casing 31 is minimized.

Referring now to FIG. 5 where the reference numbers denote the same parts as in FIG. 2, in this second embodiment the fail-safe mount 50 is a bulkhead 66 of the intake 12. Alternatively, the bulkhead 66 may be located at the front of the rigid containment casing 25. Thus the third or fail-safe mount arrangement 50 is spaced axially apart from both the front and rear mounts 40, 42. As in the first embodiment, the fail-safe mount arrangement 50, the front and rear mounts 40, 42 are connected to independent and discrete mount pads 60, 62, 64 on the pylon 33 and which are spaced axially apart from one another. Alternatively, a single mount pad (60, 62) may be used for connecting the pylon to the front and fail-safe mounts 40, 50. The mounts 40, 42, 50 are connected discrete pylon connectors 57, 58, 59, which comprise the mount pads 60, 62, 64 and rigid strut arrangements 61, 63, 65.

The second embodiment of the present invention is suited to either a three- or a two-shaft engine.

Figure 6:
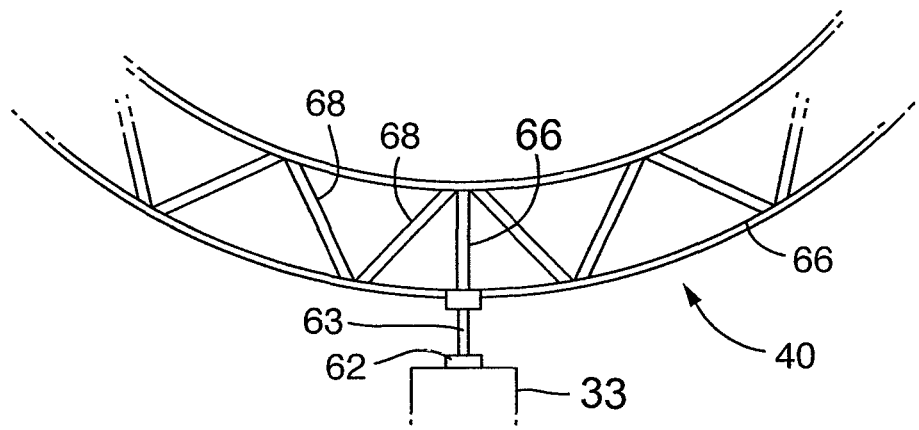
FIG. 6 is a view on arrow C in FIG. 5.

FIG. 6 is a view on arrow C in FIG. 5 and shows the bulkhead 66. The bulkhead 66 is fabricated from a frame with bracing members 68. Alternatively, the bulkhead may be a solid planar section or a monolithic structure and may possibly comprise flanges.

Figure 7:
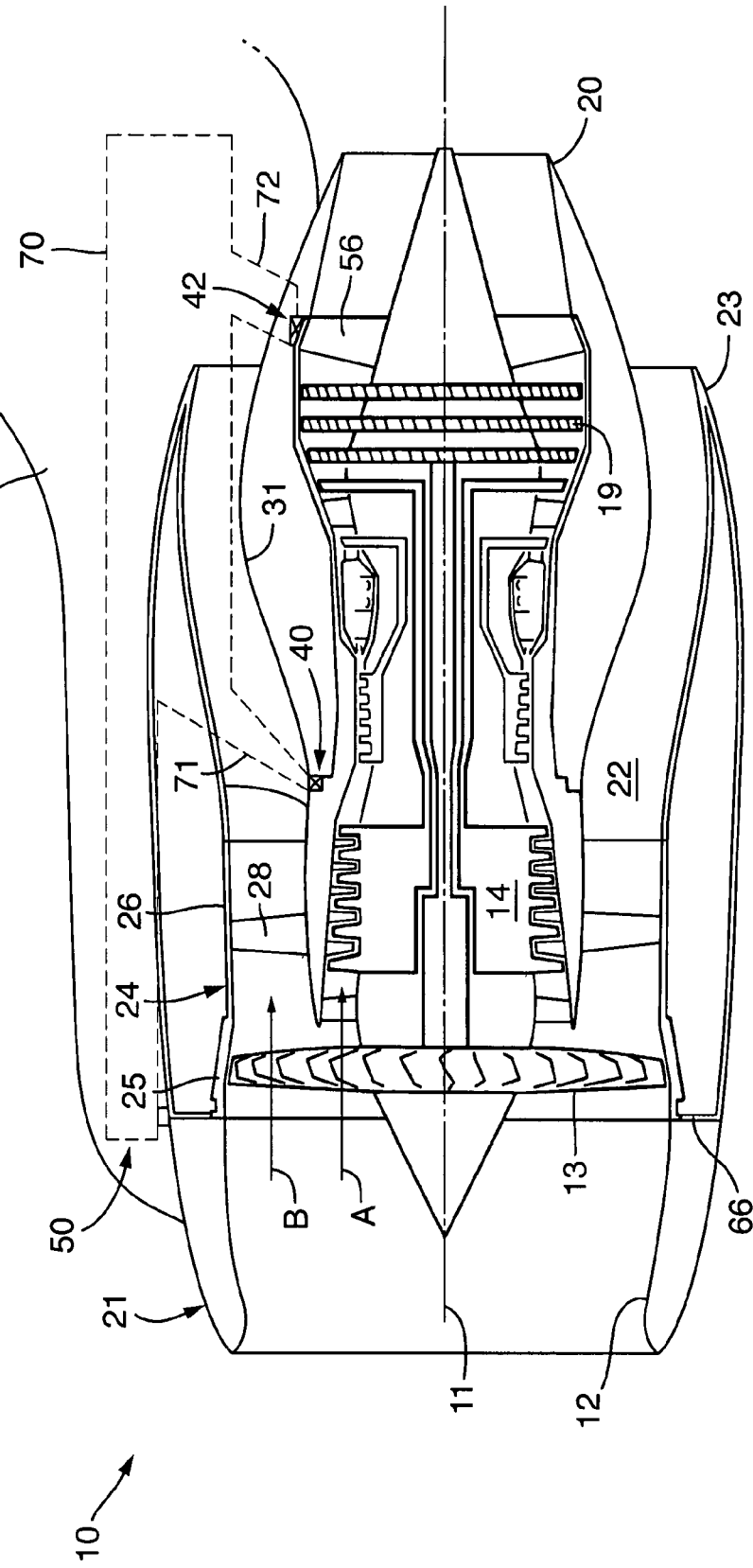
FIG. 7 is a schematic section an alternative arrangement of the second embodiment of the present invention.

FIG. 7 shows an alternative arrangement of the second embodiment, where the engine 10 is surrounded by a short nacelle 21 creating a discrete bypass duct 22 exhaust flow and a discrete core engine exhaust flow. Here, the pylon 33 comprises a rigid frame 70 with front and rear pylon connections 71, 72 attaching to front and rear mounts 40, 42 respectively. In this embodiment, the front mount 40 is attached directly to the core engine casing 31 and rear mount 42 is attached directly to the tail bearing housing 56. The fail-safe mount 50, as in the first example of the second embodiment, is a bulkhead 66 of the intake 12 or of the rigid containment casing 25. As in the other embodiments described herein, the front and rear mounts 40, 42 may be arranged, with suitable and well known mounting brackets and other structure to carry any combination of the engine and aerodynamic loads. Thus in the event of failure of one of the front or rear mounts the fail-safe mount is design to accommodate any one of thrust, vertical and side loads and together with the remaining primary mount torque loads.

Figure 8:
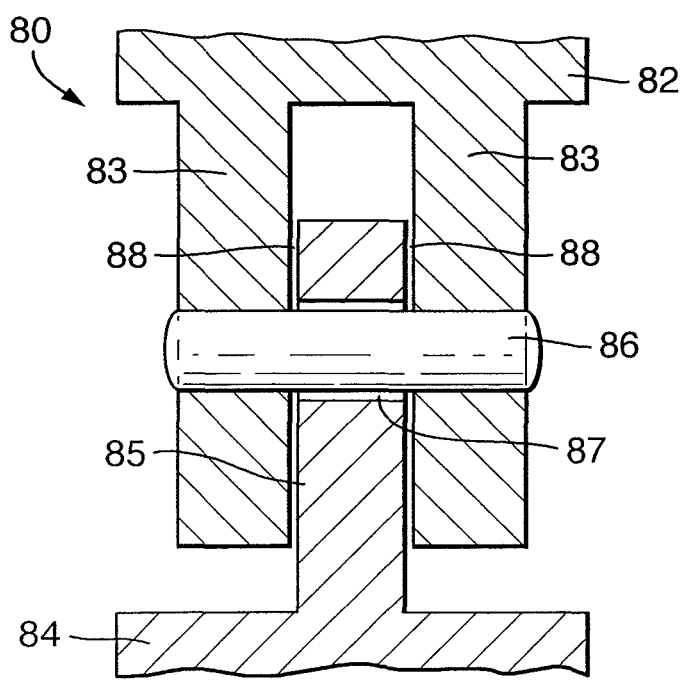
FIG. 8 is a section through a fail-safe mount bracket in accordance with the present invention.

One preferred configuration of a mounting bracket arrangement for the fail-safe mount 50 is shown in FIG. 8. As in each embodiment, the fail-safe mount 50 does not transmit loads between the engine 10 and a pylon 33 except in the event of damage to either the front or rear mounts 40, 42. A mount bracket 80 comprises a tongue and groove arrangement, in this example the supporting engine structure 82 (e.g. the bulkhead 66) comprises a groove formation 83 and the pylon structure 84 (e.g. the discrete pylon connector 59) comprises a tongue formation 85. A pin 86 extends through aligned holes defined in the tongue and groove formations 83, 85 and is secured by means not shown. To ensure no substantial normal engine load is transmitted via the fail-safe mount 50, clearance gaps 88 and 87 are provided.

Clearance gap 87, defined between the pin 86 and the tongue 85, is annular and prevents vertical and side loads from transferring between pin and tongue. Clearance gaps 88, defined between the groove 83 and the tongue 85, prevent thrust loads from transferring between groove and tongue formations.

It should be appreciated that the thrust links 44 are preferred but may be optional where the outlet guide vane array 28 is particularly stiff. In this case the engine thrust loads may be transferred to the pylon via front mount 40 and/or rear mount 42, where the tail bearing housing 56 is also a particularly stiff structure.

We claim:

1. A gas turbine engine mounting arrangement comprising:
    a pylon;
    a gas turbine engine comprising a core engine casing, a fan casing comprising a rigid containment casing, a tail bearing housing and a nacelle comprising a structurally stiff inner wall;
    a front mount directly connected to the fan casing or to the core engine casing, the front mount being connected to the pylon by a first pylon connector;
    a rear mount directly connected to the tail bearing housing or the structurally stiff inner wall, the rear mount being connected to the pylon by a second pylon connector, wherein the front and rear mounts are axially separated from one another; and a fail-safe mount directly connected to the structurally stiff inner wall or the rigid containment casing, the fail-safe mount being connected to the pylon by a third pylon connector, wherein said fail-safe mount is axially spaced from the front and rear mounts, wherein the fail-safe mount does not transmit loads between the engine and the pylon except in the event of failure to either the front or rear mounts so that any load combination on the front and rear mounts may be transferred to the fail-safe mount.

2. A gas turbine engine mounting arrangement as claimed in claim 1 wherein each pylon connector comprises a mount pad and a frame.

3. A gas turbine engine mounting arrangement as claimed in claim 1 wherein the engine comprises an annular array of outlet guide vanes connecting the core engine casing and the fan casing.

4. A gas turbine engine mounting arrangement as claimed in claim 3 wherein the front mount is positioned on the fan casing adjacent the annular array of outlet guide vanes.

5. A gas turbine engine mounting arrangement as claimed in claim 1 wherein the structurally stiff inner wall is capable of carrying loads between the fan casing and the rear mount.

6. A gas turbine engine mounting arrangement as claimed in claim 5 wherein the rear mount is connected to the tail bearing housing.

7. A gas turbine engine mounting arrangement as claimed in claim 5 wherein the rear mount connects the tail bearing housing and the structurally stiff inner wall.

8. A gas turbine engine mounting arrangement as claimed in claim 7 wherein the rear mount comprises at least one A-frame located between and connecting the tail bearing housing and the structurally stiff inner wall.

9. A gas turbine engine mounting arrangement as claimed in claim 5 wherein the fail-safe mount comprises at least one A-frame, the A-frame connecting the core engine casing and the structurally stiff inner wall.

10. A gas turbine engine mounting arrangement as claimed in claim 9 wherein the fail-safe mount comprises more than one A-frame, the A-frames are arranged symmetrically to accommodate commonly spaced port and starboard pylon installations.

11. A gas turbine engine mounting arrangement as claimed in claim 10 wherein the pylon connects to two circumferentially spaced A-frames.

12. A gas turbine engine mounting arrangement as claimed in claim 11 wherein the pylon comprises a mount beam which extends circumferentially about part of the engine and connects to the two circumferentially spaced A-frames.

13. A gas turbine engine mounting arrangement as claimed in claim 9 wherein the at least one A-frame is rigidly connected between the core engine casing and the structurally stiff inner wall and provides rigidity to each.

14. A gas turbine engine mounting arrangement as claimed in claim 1 wherein the front mount is positioned on the core engine casing.

15. A gas turbine engine mounting arrangement as claimed in claim 1 wherein either an inlet of the gas turbine engine or the fan casing comprises a bulkhead, the fail-safe mount is attached to the bulkhead.

16. A gas turbine engine mounting arrangement as claimed in claim 15 wherein the fan casing comprises a fan containment casing and a rearward casing, the bulkhead is formed on the fan containment casing.

17. A gas turbine engine mounting arrangement as claimed in claim 15 wherein the fail-safe mount is positioned forward of the front mount.

18. A gas turbine engine mounting arrangement as claimed in claim 15 wherein the bulkhead comprises a frame.

* * * * *